(No Model.)
J. BACHELDER.
AGRICULTURAL MACHINE.
No. 278,675. Patented June 5, 1883.
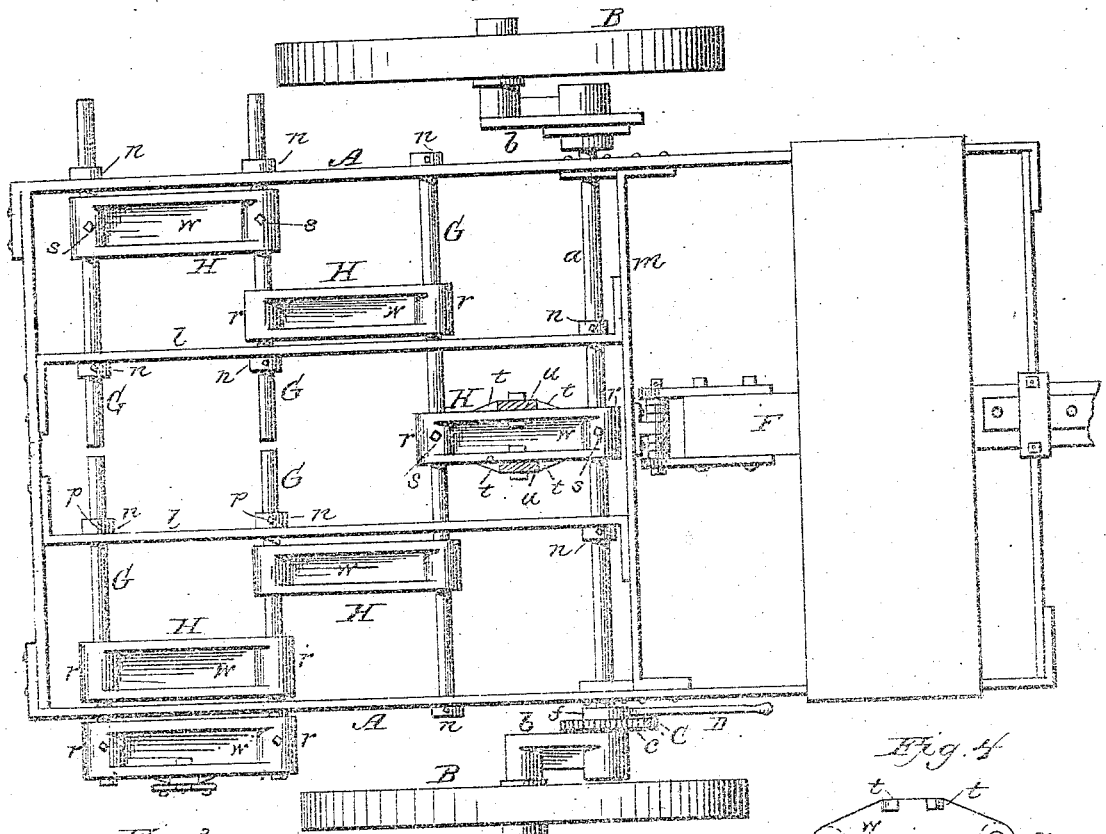
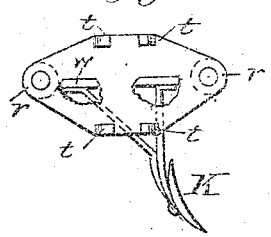
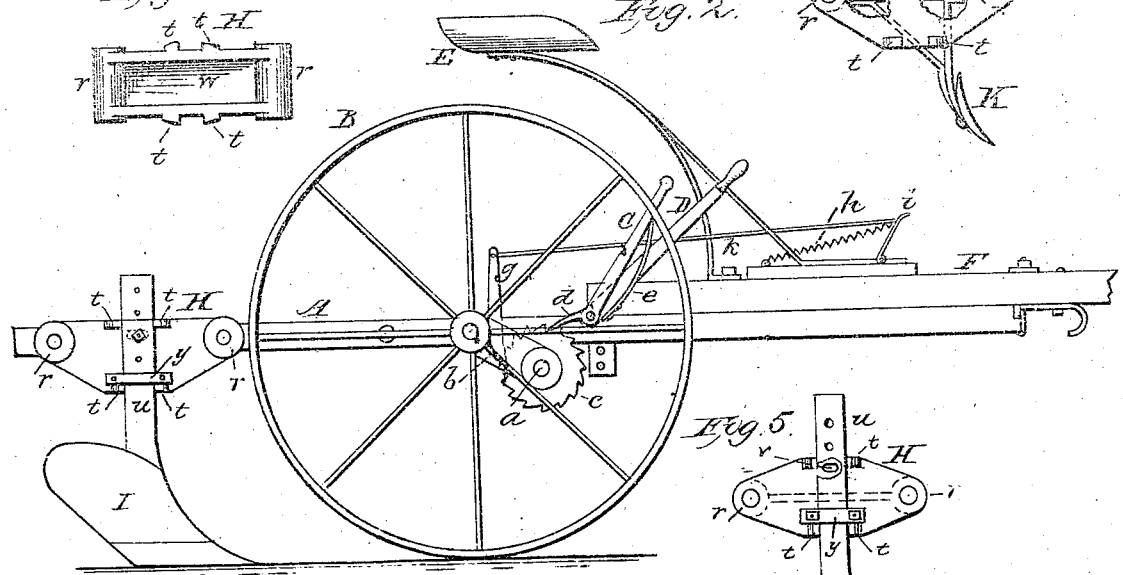
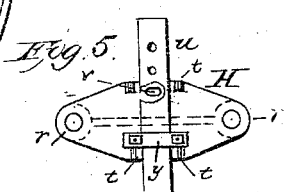
WITNESSES
F. L. Durand
N. E. Oliphant
INVENTOR
John Bachelder
per Chas. H. Howe
Attorney

UNITED STATES PATENT OFFICE.

JOHN BACHELDER, OF NAPA, CALIFORNIA.

AGRICULTURAL MACHINE.

SPECIFICATION forming part of Letters Patent No. 278,675, dated June 5, 1883.

Application filed February 21, 1883. (No model.)

*To all whom it may concern:*

Be it known that I, JOHN BACHELDER, a citizen of the United States, residing at Napa, in the county of Napa and State of California, have invented new and useful Improvements in Agricultural Machines; and I do hereby declare that the following is a full, clear, and exact description of the same, reference being had to the annexed drawings, making a part of this specification, and to the letters and figures of reference marked thereon.

Figure 1 of the drawings is a top plan view of an agricultural carriage constructed in accordance with my invention. Fig. 2 is a side elevation thereof, showing a plow attached; Fig. 3, a plan view, in detail, of one of the brackets for connecting thereto the plow or other agricultural tool; Fig. 4, a side elevation thereof, with a portion of the side broken away to show the manner of attaching a cultivator-foot to the horizontal web-plate; and Fig. 5, a side view of a bracket with plow connected thereto.

The object of the present invention is to provide a carriage for agricultural purposes to which any tool—such as a plow, cultivator, weeder or horse-hoe, corn-planter or grain-drill, and the like—may readily and conveniently be attached, thus providing a machine that will answer the purposes of the various agricultural machines now in ordinary use. To obtain these objects I construct a carriage with means for readily attaching the agricultural tool to an adjustable frame, also providing it with means for controlling the carriage tools or implements, and their position changed to cover any part or all of the surface of ground passed over.

The invention consists in the details of construction substantially as shown in the drawings and hereinafter described and claimed.

In the accompanying drawings, A represents a metal frame of any desirable size and shape, and having connected thereto the axle $a$. Upon the ends of the axle $a$ are mounted crank-arms $b$, which have loosely connected thereto driving-wheels B, of the ordinary construction, one or both of said crank-arms being cast with or having suitably attached a ratchet-wheel, $c$. A pawl, $d$, engages with the teeth of the ratchet-wheel $c$, said pawl extending from a hand-lever, C, pivoted to the frame A, or, if desired, to the lower end of a second lever, D, which has a suitable spring, $e$, connected thereto to press upon the lever C to keep the pawl engaged with the teeth of the ratchet-wheel. The lever D is loosely mounted upon the axle $a$ by having formed at its lower extremity an eye or collar, $f$, through which the axle passes. A grip of the hand around the levers C D will bring them together, and by so doing release the pawl $d$, and by moving the levers in either direction the wheels B are raised or lowered, as the case may be, changing the position of the crank-arms $b$. Similar ratchet-wheel, pawl, and levers may be connected to the opposite end of the axle, should it be required.

The raising or lowering of the frame of the carriage may be accomplished by the employment of side bars pivoted at their forward ends to the frame of the carriage, and at their rear ends supporting the axle upon which the wheels are loosely mounted, drums being connected to the axle, over which pass suitable chains, the drums having ratchet-wheels similar to the crank-arms; also pawls and levers, by which the rear ends of the side bars are raised or lowered, carrying with them the wheels, and thus adjusting the height of the carriage-frame. In either case, if found desirable, an additional pawl, $g$, may be employed to engage with the teeth of the ratchet-wheel $c$ upon the rear side thereof, said pawl being held in engagement with the teeth by a suitable spring, $h$, and is connected to a tappet, $i$, by the rod $k$, the pawl being released by pressure of the foot against the tappet as the driver is in position upon the seat E.

The carriage as herein described may be constructed in any suitable manner as will admit of the varying adjustments of the height of the frame from the ground, the means described being, however, considered the most simple and practical.

The shaft or tongue F may be connected to the frame A in any desirable manner, either by hook bolts or clamps, as shown in Fig. 1.

The carriage-frame A is strengthened by longitudinal metal braces $l$ and transverse metal brace m, which also form supports for suitable guide-rods, G, extending parallel with the axle a. These rods G may be of any desirable number, either extending the entire width of the frame A or made in short sections, each section passing through one side of the frame and through one of the braces l. Any or all of the guide-rods may also be of sufficient length to extend beyond the sides of the frame A, the rods being held in place by collars n and set-screws p, or by any other convenient means. These rods G are not only adjustable within the frame A, but also removable therefrom, by detaching the collars n, said rods being used as a support for one or more of the metal brackets H, to which the agricultural tool or implement is secured. The brackets H are each cast with horizontal sleeves r, through which the rods G pass, and are held at any desirable position upon the rods by the set-screws s, passing through the sleeves. The sides of the brackets H are cast with flanges t, between which the stem u of a plow, I, or other tool or implement used in farming, is held and securely fastened to the bracket by bolt and nut, as shown in Fig. 2, said bolt passing through one of a series of holes in the stem u and a corresponding hole through the side of the bracket.

In some cases the flanges t may be dispensed with or only formed upon one side of the brackets; and, if preferred, the hole in its side may be made elongated, as shown in Fig. 5, to admit the stem of the plow to be set at an angle from a perpendicular, so that when the stem is thrown forward at its upper end the plow-point will be extended downward, this being found desirable when the point of the plow becomes dull. In order to make provision for this adjustment of the plow-stem, in addition to the elongated hole or slot v, the upper ones of the flanges are placed farther apart.

The sides of the bracket H are connected or joined together by a horizontal web, w, to the under side of which may be secured the ordinary stem and brace of a cultivator-foot, K, as shown in Fig. 4. Clamping-plates y are also employed as an additional means for securing the stem u to the side of the bracket.

By the employment of the brackets H the stems of all tools or agricultural implements may be readily connected thereto and adjusted thereon as circumstances require, while any number of the brackets may be used and placed at any point along the guide-rods G, either at the outer sides of the frame A or within the frame, as found necessary.

The tools can be set to work any depth desired in the soil by either adjusting the height of the tool with relation to the bracket or regulating the height of the carriage-frame.

Having now fully described my invention, what I claim as new, and desire to secure by Letters Patent, is—

1. A bracket adapted to be attached to the frame of an agricultural machine, said bracket having sleeves, and its sides connected by a web and flanges upon the sides, substantially as and for the purpose specified.

2. In an agricultural machine, a frame having removably connected thereto a series of transverse guide-rods, in combination with one or more brackets provided with means for attaching thereto the stem of the implement, either between or to the sides of the bracket, the guide-rods passing through sleeves at each end of the brackets, substantially as and for the purpose specified.

3. In an agricultural machine, an adjustable frame having removable transverse guide-rods connected thereto, in combination with one or more brackets for holding the stem of the tool or implement, said brackets having sleeves through which the rods pass, and webs and flanges, substantially as and for the purpose set forth.

In testimony that I claim the above I have hereunto subscribed my name in the presence of two witnesses.

JOHN BACHELDER.

Witnesses:
A. J. HULL,
PHILIP PLARS.